(12) United States Patent
Watanabe et al.

(10) Patent No.: US 11,079,618 B2
(45) Date of Patent: Aug. 3, 2021

(54) IMAGING SYSTEM AND IMAGING METHOD

(71) Applicant: HAMAMATSU PHOTONICS K.K., Hamamatsu (JP)

(72) Inventors: Koyo Watanabe, Hamamatsu (JP); Koji Takahashi, Hamamatsu (JP); Takashi Inoue, Hamamatsu (JP); Haruyasu Ito, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 241 days.

(21) Appl. No.: 16/089,400

(22) PCT Filed: Mar. 15, 2017

(86) PCT No.: PCT/JP2017/010430
§ 371 (c)(1),
(2) Date: Sep. 28, 2018

(87) PCT Pub. No.: WO2017/169789
PCT Pub. Date: Oct. 5, 2017

(65) Prior Publication Data
US 2020/0301174 A1    Sep. 24, 2020

(30) Foreign Application Priority Data
Mar. 30, 2016    (JP) .............................. JP2016-067875

(51) Int. Cl.
*G02F 1/01*    (2006.01)
*G02B 5/30*    (2006.01)
*H04N 5/232*    (2006.01)

(52) U.S. Cl.
CPC ......... *G02F 1/0105* (2013.01); *G02B 5/3025* (2013.01); *G02F 1/0136* (2013.01); *H04N 5/232121* (2018.08); *H04N 5/232* (2013.01)

(58) Field of Classification Search
CPC .... G02F 1/0105; G02F 1/0136; G02B 5/3025
(Continued)

(56) References Cited

U.S. PATENT DOCUMENTS 6,252,222 B1* 6/2001 Kasapi ................ G01R 31/308
                                                        250/214 R
7,256,885 B2* 8/2007 Silberberg ............ G01N 21/65
                                                        356/301
(Continued)

FOREIGN PATENT DOCUMENTS

CN          1763499 A       4/2006
CN         106233107 A      12/2016
(Continued)

OTHER PUBLICATIONS

Omid Masihzadeh, Philip Schlup, and Randy A. Bartels, "Complete polarization state control of ultrafast laser pulses with a single linear spatial light modulator," Opt. Express 15, 18025-18032 (2007) (Year: 2007).*

(Continued)

*Primary Examiner* — Zachary W Wilkes
(74) *Attorney, Agent, or Firm* — Faegre Drinker Biddle & Reath LLP

(57) ABSTRACT

An imaging system includes a light source for outputting initial pulsed light, a polarization control unit for rotating a polarization plane of the initial pulsed light, an optical pulse shaping unit for inputting the initial pulsed light with the rotated polarization plane, and outputting first pulsed light $Lp_1$ having a first polarization direction and second pulsed light $Lp_2$ having a second polarization direction different from the first polarization direction with a time, an irradiation optical system for irradiating an imaging object with the pulsed light $Lp_1$ and the pulsed light $Lp_2$, a light separation element for separating the pulsed light $Lp_1$ and the pulsed light $Lp_2$ reflected by or transmitted through the imaging (Continued)

object on the basis of the polarization directions, an imaging unit for imaging the pulsed light $Lp_1$, and an imaging unit for imaging the pulsed light $Lp_2$.

6 Claims, 11 Drawing Sheets

(58) Field of Classification Search
USPC .................................. 356/300–334; 359/246
See application file for complete search history.

(56) References Cited

U.S. PATENT DOCUMENTS

| | | | |
|---|---|---|---|
| 7,760,342 B2* | 7/2010 | Zanni | G01J 3/433 |
| | | | 356/51 |
| 10,378,964 B2* | 8/2019 | Takahashi | G01J 11/00 |
| 2009/0161092 A1* | 6/2009 | Zanni | G01J 3/433 |
| | | | 356/51 |

FOREIGN PATENT DOCUMENTS

| | | |
|---|---|---|
| JP | 2001-255354 A | 9/2001 |
| JP | 2009-500856 A | 1/2009 |
| JP | 2012-68261 A | 4/2012 |
| JP | 2013-15500 A | 1/2013 |
| JP | 2015-41784 A | 3/2015 |
| WO | WO-2007/008615 A2 | 1/2007 |

OTHER PUBLICATIONS

K. Nakagawa et al., "Sequentially timed all-optical mapping photography (STAMP)," Nature Photonics, Sep. 2014, pp. 695-700, vol. 8.
Miu Tamamitsu et al., "Design for sequentially timed all-optical mapping photography with optimum temporal performance," Optics Letters, Feb. 2015, pp. 633-636, vol. 20, No. 4.
International Preliminary Report on Patentability dated Oct. 11, 2018 for PCT/JP2017/010430.

* cited by examiner

Fig.3
(a)
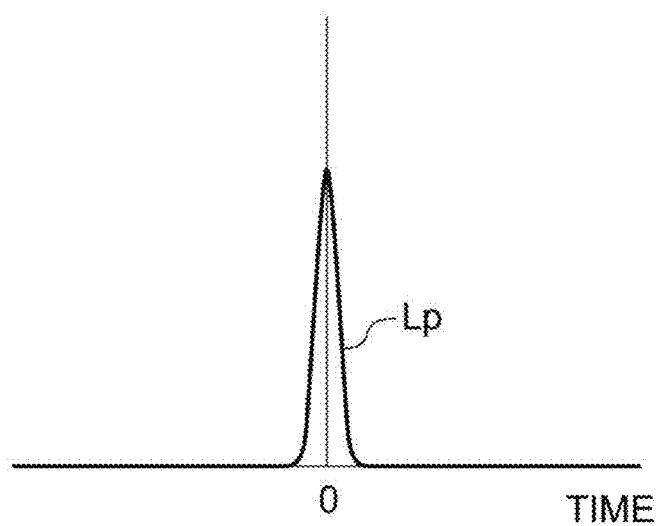
(b)
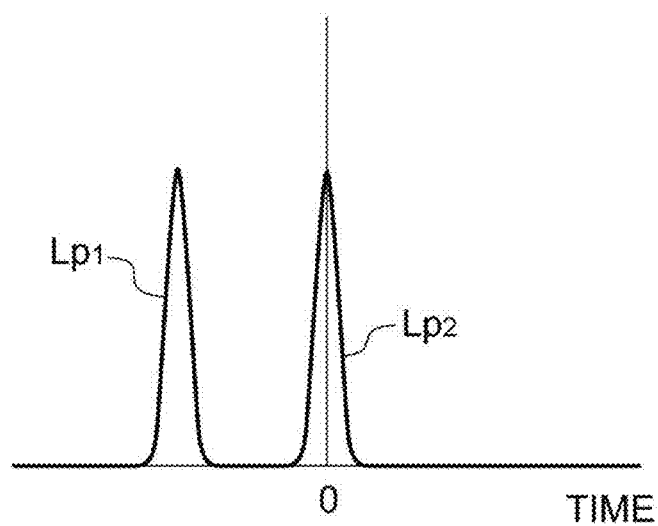
(c)
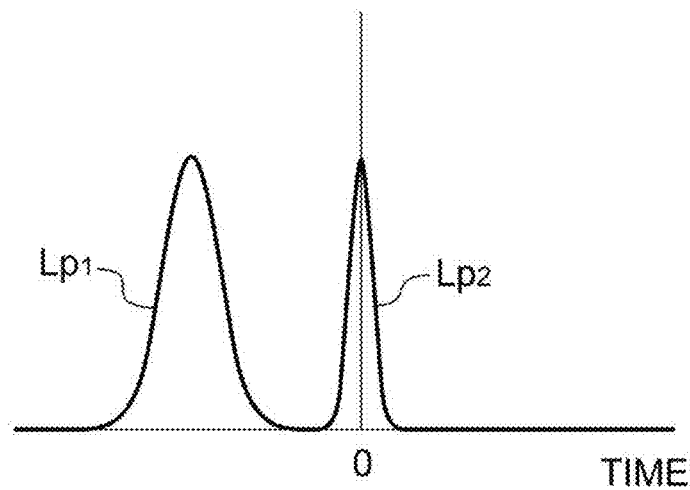

*Fig.5*
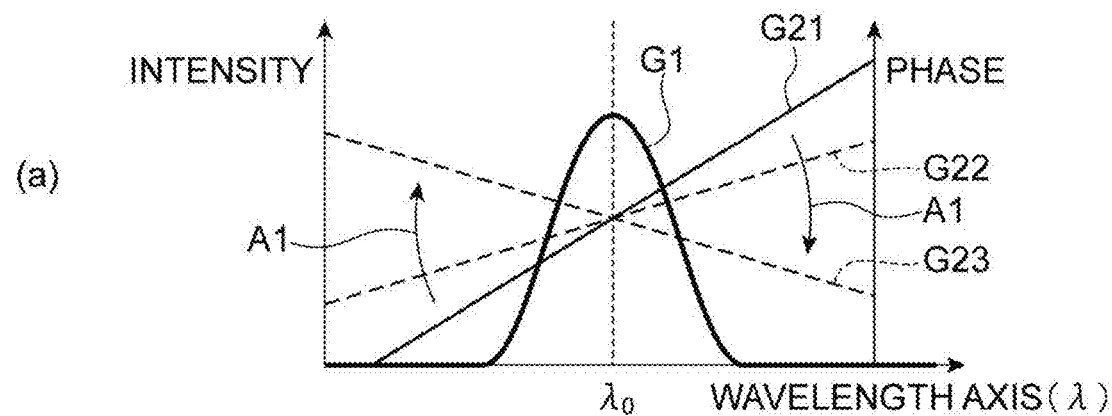
(a)
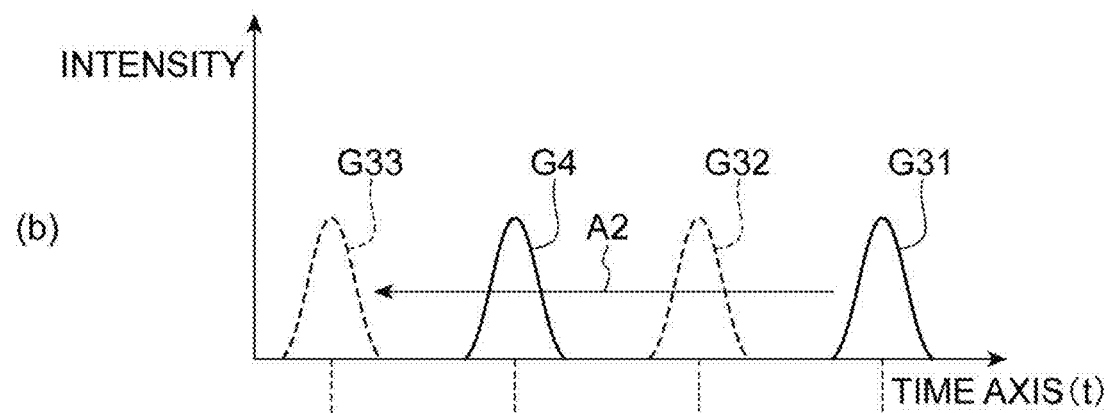
(b)
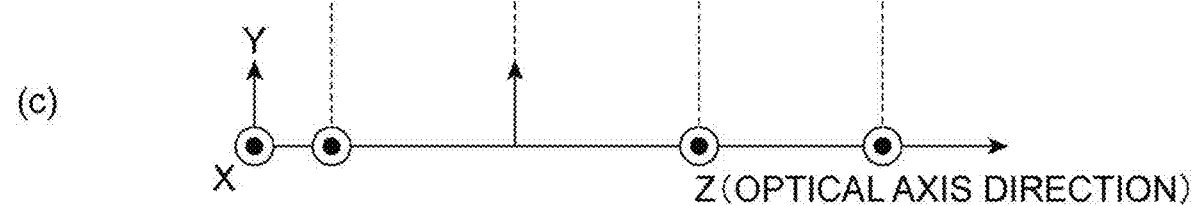
(c)

*Fig.6*
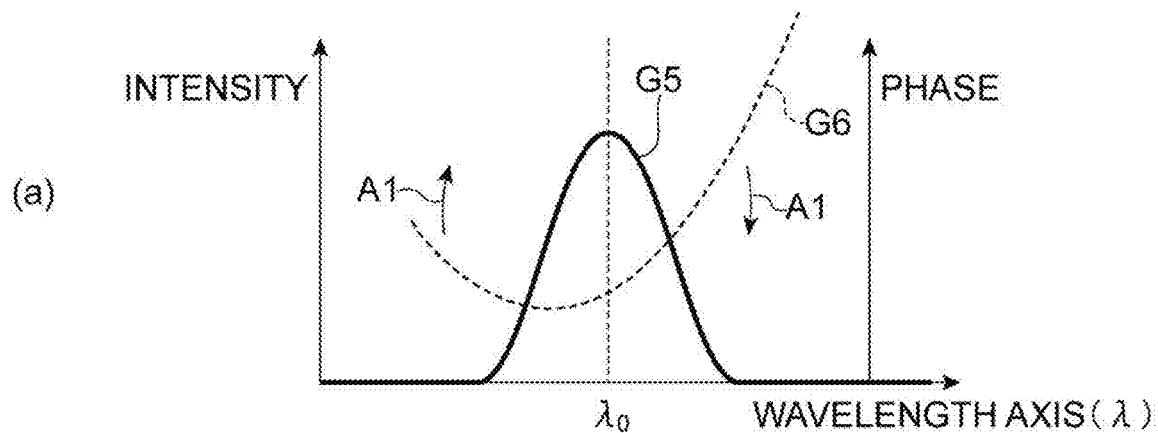
(a)
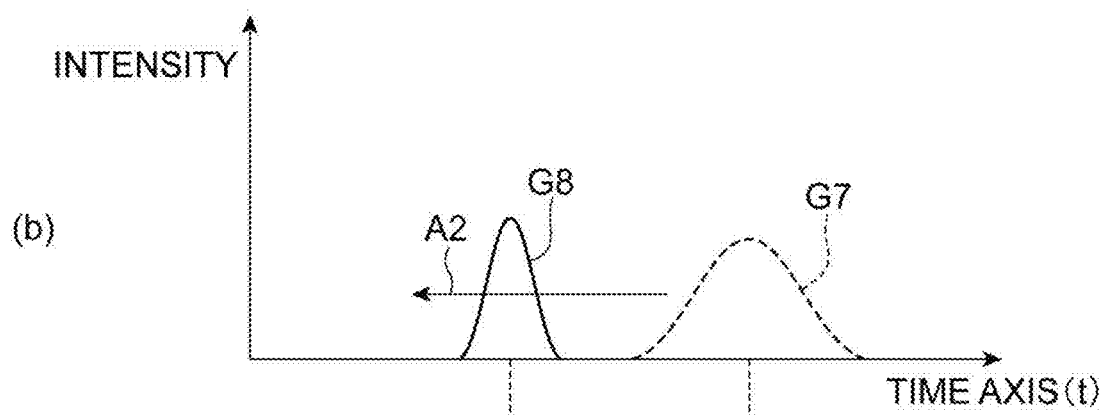
(b)
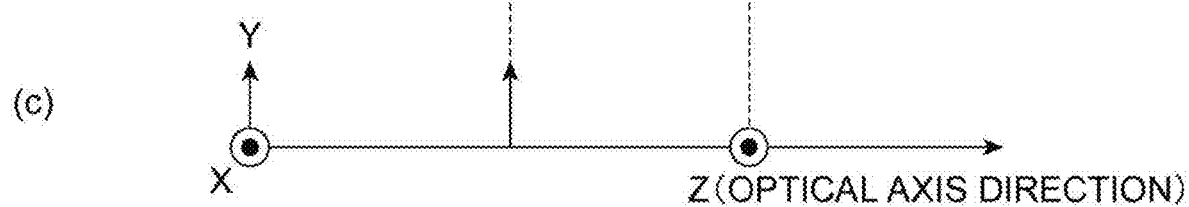
(c)

IMAGING SYSTEM AND IMAGING METHOD

TECHNICAL FIELD

The present disclosure relates to an imaging system and an imaging method.

BACKGROUND ART

Patent Document 1 and Non Patent Documents 1 and 2 disclose techniques related to high-speed imaging. In the apparatuses and methods described in these documents, first, irradiation light (strobe light) including a plurality of light pulses having different wavelengths from one another and having a time difference is generated from a single light pulse. Next, an imaging object is irradiated with the irradiation light, and image information of the imaging object at a plurality of timings corresponding to respective wavelengths is recorded in transmitted light or reflected light from the imaging object. Then, the transmitted light or the reflected light is spatially separated for each wavelength component, and each wavelength component is imaged.

CITATION LIST

Patent Literature

Patent Document 1: Japanese Patent Application Laid-Open Publication No. 2015-41784

Non Patent Literature

Non Patent Document 1: K. Nakagawa et al., "Sequentially timed all-optical mapping photography (STAMP)", Nature Photonics 8, pp. 695-700 (2014)

Non Patent Document 2: M. Tamamitsu et al., "Design for sequentially timed all-optical mapping photography with optimum temporal performance", Optics Letters 40, pp. 633-636 (2015)

SUMMARY OF INVENTION

Technical Problem

As described in Non Patent Document 2, when the time difference (that is, a frame interval) between the plurality of light pulses is attempted to be made short in the above conventional method, a phenomenon of overlap of the light pulses temporally adjacent to each other occurs. This is because the wavelengths of the light pulses are different from one another (that is, subject to band limitation), and thus a temporal waveform of each light pulse is significantly extended as compared with the original single light pulse. As a result, motion blur (blur occurring when a moving object is imaged with a camera) occurs in a captured image. Therefore, further shortening of the frame interval (imaging interval) is difficult in the above conventional method.

An object of an embodiment is to provide an imaging system and an imaging method.

Solution to Problem

An embodiment of the present invention is an imaging system. The imaging system includes a light source for outputting at least one initial pulsed light, a polarization control unit for rotating a polarization plane of the initial pulsed light, an optical pulse shaping unit for inputting the initial pulsed light with the rotated polarization plane, and outputting first pulsed light having a first polarization direction and second pulsed light having a second polarization direction different from the first polarization direction with a time difference from each other, an irradiation optical system for irradiating an imaging object with the first pulsed light and the second pulsed light, a light separation element for separating the first pulsed light and the second pulsed light reflected by or transmitted through the imaging object on the basis of the polarization directions, a first imaging unit for capturing an image of the separated first pulsed light, and a second imaging unit for capturing an image of the separated second pulsed light.

Further, an embodiment of the present invention is an imaging method. The imaging method includes a light output step of outputting at least one initial pulsed light, a light control step of rotating a polarization plane of the initial pulsed light, an optical pulse shaping step of inputting the initial pulsed light with the rotated polarization plane, and outputting first pulsed light having a first polarization direction and second pulsed light having a second polarization direction different from the first polarization direction with a time difference from each other, an irradiation step of irradiating an imaging object with the first pulsed light and the second pulsed light, a separation step of separating the first pulsed light and the second pulsed light reflected by or transmitted through the imaging object on the basis of the polarization directions, and an imaging step of capturing images of the separated first pulsed light and the second pulsed light.

In the above imaging system and imaging method, the irradiation optical system (or in the irradiation step) irradiates the imaging object with the first pulsed light and the second pulsed light having different polarization directions from each other and having a time difference as irradiation light (strobe light). Then, reflected light or transmitted light from the imaging object is separated on the basis of the polarization directions. In this case, since each pulsed light component is not subject to the band limitation, the time difference between the pulsed light components can be made shorter than the above conventional technique. That is, according to the above imaging system and imaging method, the frame interval can be further shortened without being affected by the motion blur.

Advantageous Effects of Invention

According to the imaging system and the imaging method of the embodiment, the imaging interval can be further shortened.

BRIEF DESCRIPTION OF DRAWINGS

FIG. 3 includes diagrams illustrating (a) an example of a temporal waveform of pulsed light output from a light source, (b) an example of temporal waveforms of two pulsed light components output from an optical pulse shaping unit, and (c) an example of temporal waveforms of two pulsed light components having different temporal waveforms from each other and having a time difference.

FIG. 5 includes diagrams illustrating (a) a spectrum waveform to be applied to first pulsed light, (b) temporal intensity waveforms of first pulsed light and second pulsed light, and (c) polarization directions of pulsed light components illustrated in (b).

FIG. 6 includes diagrams illustrating (a) a spectrum waveform to be applied to first pulsed light, (b) temporal intensity waveforms of first pulsed light and second pulsed light, and (c) polarization directions of pulsed light components illustrated in (b).

DESCRIPTION OF EMBODIMENTS

Hereinafter, embodiments of an imaging system and an imaging method will be described in detail with reference to the accompanying drawings. In the description of the drawings, the same elements will be denoted by the same reference signs, and overlapping description will be omitted.

Figure 1:
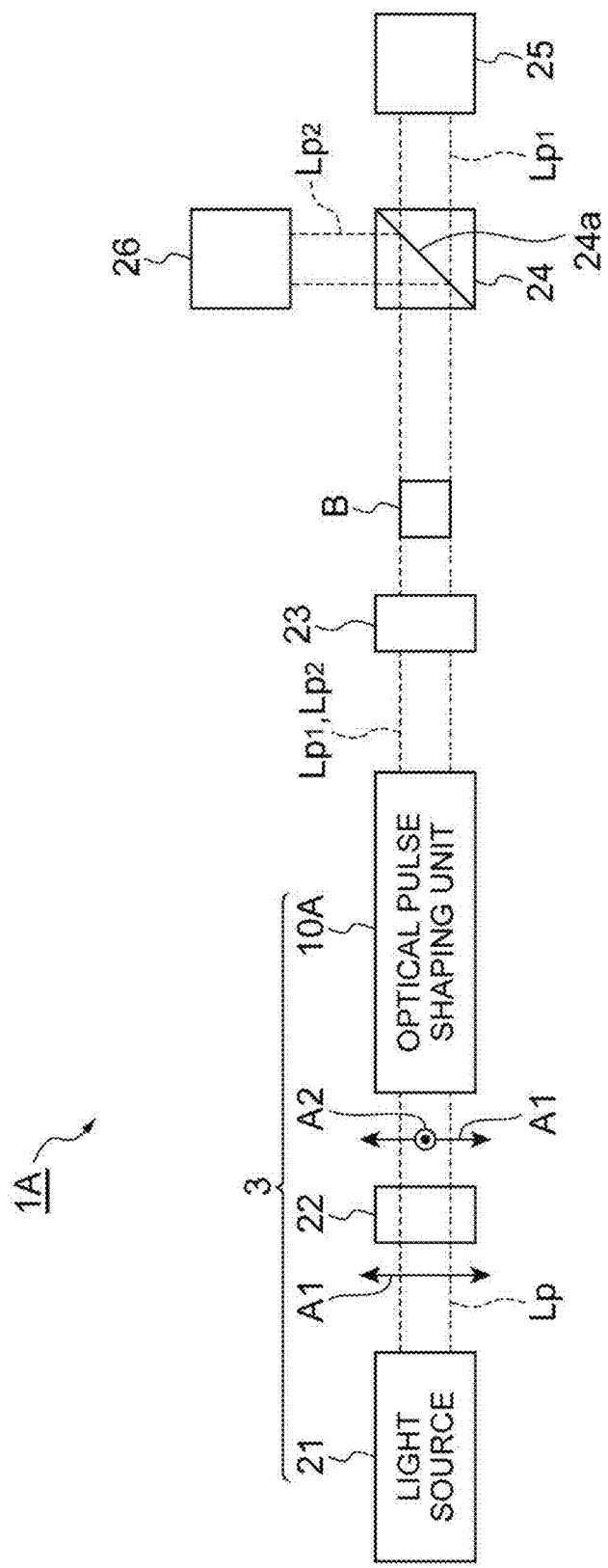
FIG. 1 is a diagram schematically illustrating a configuration of an imaging system according to an embodiment.

FIG. 1 is a diagram schematically illustrating a configuration of an imaging system 1A according to an embodiment. As illustrated in FIG. 1, the imaging system 1A includes an irradiation apparatus 3, a light separation element 24, a first imaging unit (camera) 25, and a second imaging unit (camera) 26.

The irradiation apparatus 3 irradiates an imaging object B with first pulsed light (first sub pulsed light) $Lp_1$ having a first polarization direction, and second pulsed light (second sub pulsed light) $Lp_2$ having a second polarization direction different from the first polarization direction (for example, orthogonal to the first polarization direction) with a time difference from each other. For this purpose, the irradiation apparatus 3 includes a light source 21, a polarization control unit 22, an optical pulse shaping unit (pulse shaper) 10A, and an irradiation optical system 23.

The light source 21 outputs, for example, at least one pulsed light Lp (initial pulsed light) such as laser light. The light source 21 is constituted by, for example, a solid-state laser such as a titanium sapphire laser and a YAG laser, a fiber laser, or a semiconductor laser. Then, the pulsed light Lp has a linear polarization (polarization direction A1). (a) in FIG. 3 illustrates an example of a temporal intensity waveform of the pulsed light Lp output from the light source 21. The vertical axis of (a) in FIG. 3 represents light intensity.

The polarization control unit (polarization control element) 22 is optically coupled to the light source 21 and rotates a polarization plane of the pulsed light Lp input to an SLM 14 described below. With the configuration, the pulsed light Lp to be input to the SLM 14 includes a polarization component in the polarization direction A1 and a polarization component in a polarization direction A2 intersecting with the polarization direction A1. The polarization direction A2 is, for example, orthogonal to the polarization direction A1. The polarization control unit 22 is, for example, an optical element. As the polarization control unit 22, for example, a wave plate such as a λ/2 plate, a polarization element, a Faraday rotator, a variable rotator, or a polarization modulation type SLM can be used. Further, a polarization plane rotation angle of the polarization control unit 22 is desirably variable.

The optical pulse shaping unit 10A inputs the initial pulsed light Lp with the rotated polarization plane, and generates the pulsed light $Lp_1$ having the first polarization direction, and the pulsed light $Lp_2$ having the second polarization direction intersecting with (for example, orthogonal to) the first polarization direction, from the input pulsed light Lp. Further, the optical pulse shaping unit 10A controls the pulsed light $Lp_1$ to have an arbitrary temporal intensity waveform, and applies a time difference with respect to the pulsed light $Lp_2$.

Figure 2:
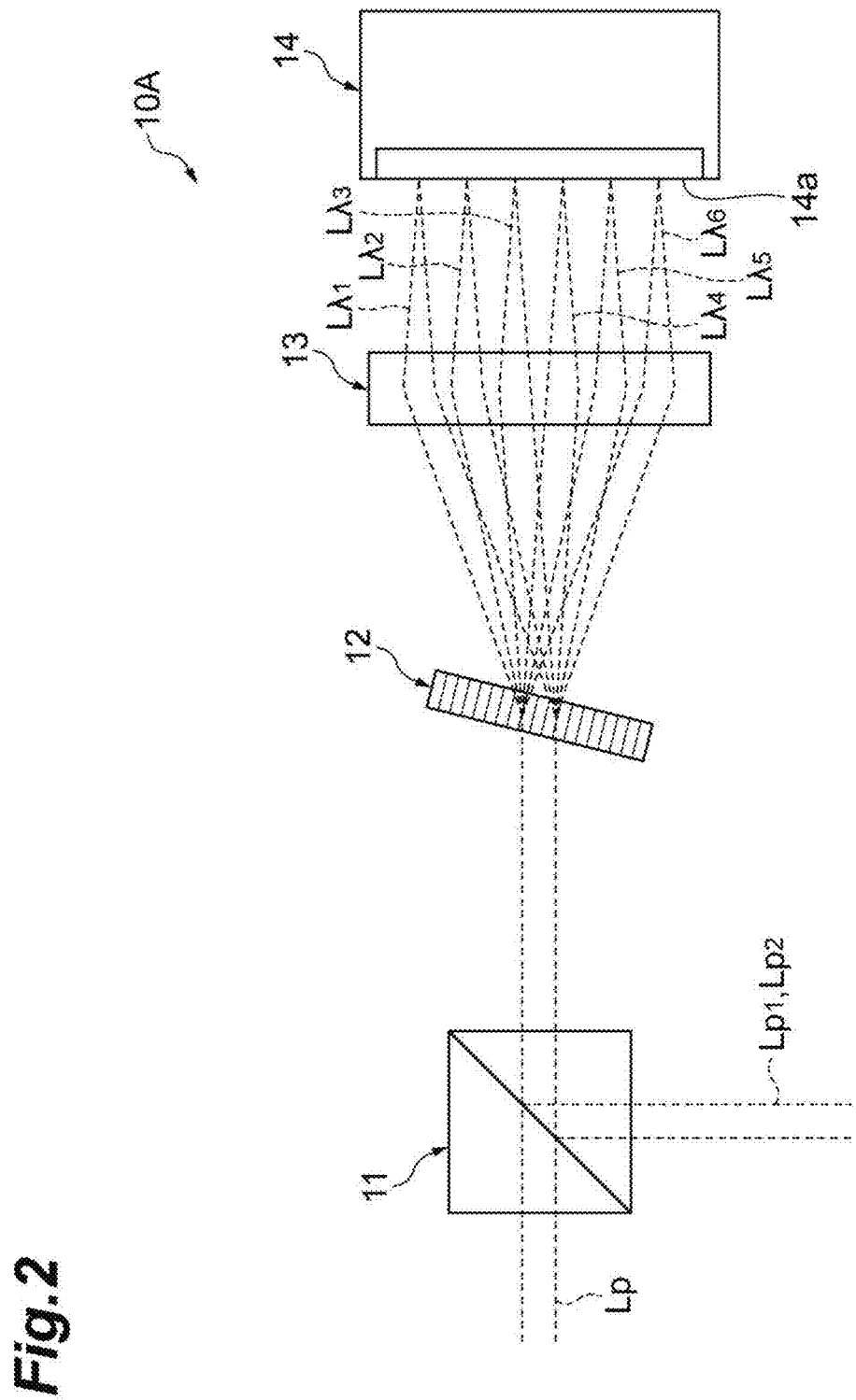
FIG. 2 is a diagram illustrating a configuration of an optical pulse shaping unit (pulse shaper).

FIG. 2 is a diagram illustrating a configuration of the optical pulse shaping unit 10A. As illustrated in FIG. 2, the optical pulse shaping unit 10A includes a beam splitter 11, a dispersive element 12, a focusing optical system 13, and the spatial light modulator (SLM) 14. Specifically, in the optical pulse shaping unit 10A, the beam splitter 11, the dispersive element 12, the focusing optical system 13, and the SLM 14 are optically coupled in this order.

The beam splitter 11 transmits the pulsed light Lp input from the polarization control unit 22. The dispersive element 12 disperses (spectrally disperses) the pulsed light Lp for respective wavelengths. Here, dispersion means spatially separating wavelength components included in the pulsed light Lp for each wavelength. FIG. 2 illustrates six wavelength components $L\lambda_1$ to $L\lambda_6$ for easy understanding. As the dispersive element 12, for example, various dispersive elements such as a diffraction grating and a prism are applicable. Further, the dispersive element 12 may be either a reflection type or a transmission type. Further, the dispersive element 12 may be constituted by a plurality of dispersive elements.

The focusing optical system 13 adjusts propagation directions of the respective wavelength components $L\lambda_1$ to $L\lambda_6$ output in different directions for respective wavelength components from the dispersive element 12, and focuses the wavelength components $L\lambda_1$ to $L\lambda_6$ on the SLM 14. Specifically, the focusing optical system 13 has a lens power in at least a plane including a wavelength dispersion direction of the dispersive element 12. As such a focusing optical system 13, for example, a lens or a cylindrical lens is used. Further, as the focusing optical system 13, not only a transmission type lens, but also a reflection type lens such as a concave mirror may be used.

The SLM 14 has a modulation plane 14a in which a plurality of modulation pixels are two-dimensionally arrayed. The SLM 14 is a phase modulation type (or phase-intensity modulation type) SLM, and modulates the pulsed light Lp after the dispersion for respective wavelengths. That is, the modulation plane 14a includes a plurality of modulation areas respectively corresponding to a plurality of wavelength components, and these modulation areas are arranged in the dispersion direction of the dispersive element 12. Then, each of the wavelength components $L\lambda_1$ to $L\lambda_6$ is input to the corresponding modulation area, and is independently modulated according to the modulation pattern presented in the modulation area. Here, the SLM 14 may be either a reflection type or a transmission type (the reflection type is illustrated in the figure). Further, the SLM 14 may be either a one-dimensional spatial light modulator or a two-dimensional spatial light modulator.

Further, the SLM 14 has polarization dependency, and has a modulation function for a certain polarization component, and does not have the modulation function for polarization components other than the above polarization component. For example, while the SLM has the modulation function for the first polarization direction of the pulsed light $Lp_1$, the SLM does not have the modulation function for the second polarization direction of the pulsed light $Lp_2$. As an example, the SLM 14 is a liquid crystal type (liquid crystal on silicon; LCOS) SLM. In the liquid crystal type SLM, since phase modulation is performed using the birefringence of the liquid crystal, only the component in the polarization direction along the orientation direction of the liquid crystal is modulated, and the component in the polarization direction orthogonal to the above polarization component is not modulated.

Figure 4:
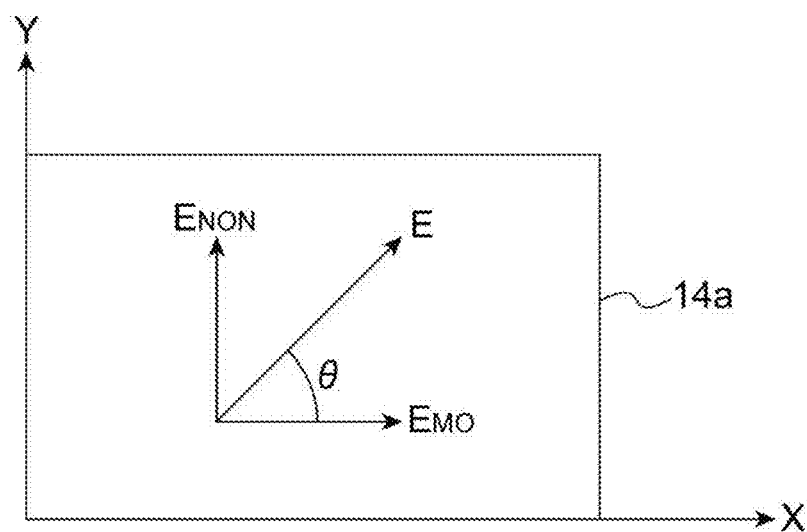
FIG. 4 is a diagram conceptually illustrating a modulation plane of a spatial light modulator.

FIG. 4 is a diagram conceptually illustrating the modulation plane 14a of the SLM 14. Here, the first polarization direction (modulation axis direction) X having the modulation function and the second polarization direction (non-modulation axis direction) Y not having the modulation function are defined. The modulation axis direction X and the non-modulation axis direction Y are orthogonal to each other, and the modulation axis direction X coincides with the orientation direction of the liquid crystal.

A polarization direction vector E (here, the magnitude of the vector corresponds to light intensity) of the pulsed light Lp to be input to the SLM 14 is rotated by the polarization control unit 22, and as a result, the vector E is inclined with respect to the modulation axis direction X. Therefore, a first polarization component $E_{MO}$ along the modulation axis direction X is modulated by the SLM 14, but a second polarization component $E_{NON}$ along the non-modulation axis direction Y orthogonal to the modulation axis direction X is reflected at (or transmitted through) the SLM 14 as it is without being modulated. Therefore, a time difference is caused between the first pulsed light $Lp_1$ including the first polarization component $E_{MO}$ and the second pulsed light $Lp_2$ including the second polarization component $E_{NON}$, by presenting a phase pattern that temporally delays (or advances) in the SLM 14 and controlling a phase spectrum of the first polarization component $E_{MO}$. This time difference is, for example, on the femtosecond order. (b) in FIG. 3 illustrates an example of temporal intensity waveforms of the pulsed light $Lp_1$ and the pulsed light $Lp_2$ output from the optical pulse shaping unit 10A.

The first polarization component $E_{MO}$ and the second polarization component $E_{NON}$ can be expressed by the following Formulas using a rotation angle θ of the polarization plane of the pulsed light Lp with respect to the modulation axis direction X. That is, an intensity ratio of the pulsed light $Lp_1$ and the pulsed light $Lp_2$ can be controlled by controlling the rotation angle θ in the polarization control unit 22. In the case where the rotation angle θ is 45°, the light intensities of the pulsed light $Lp_1$ and the pulsed light $Lp_2$ are equal to each other. The rotation angle θ (unit: degree) may be any value other than 90×n (n is an integer).

$E_{MO}$=E cos θ

$E_{NON}$=E sin θ

The SLM 14 may further present a phase pattern, that is superimposed on the phase pattern that temporally delays (or advances) the first polarization component $E_{MO}$, for changing the temporal intensity waveform of the pulsed light $Lp_1$. That is, a phase spectrum and an intensity spectrum for forming a desired temporal intensity waveform can be calculated in the case where the wavelengths of the wavelength components $L\lambda_1$ to $L\lambda_6$ are known, and therefore, the pulsed light $Lp_1$ having the desired temporal intensity waveform can be output by presenting the phase pattern based on the calculated phase spectrum and intensity spectrum in the SLM 14 to modulate the wavelength components $L\lambda_1$ to $L\lambda_6$. In that case, as illustrated in (c) in FIG. 3, the pulsed light $Lp_1$ and the pulsed light $Lp_2$ having different temporal intensity waveforms from each other and having a time difference can be easily generated. Here, the temporal intensity waveform of the pulsed light $Lp_1$ can be shaped into an arbitrary waveform, and for example, the pulsed light $Lp_1$ can be expanded in the time width, can be further divided into a plurality of pulsed light components (pulse train), or can be formed into a chirped pulse.

The wavelength components $L\lambda_1$ to $L\lambda_6$ output from the SLM 14 pass through the focusing optical system 13 again. At that time, the focusing optical system 13 outputs the wavelength components $L\lambda_1$ to $L\lambda_6$ respectively in different directions, spatially superimposes the wavelength components $L\lambda_1$ to $L\lambda_6$ in the dispersive element 12, and collimates the respective wavelength components $L\lambda_1$ to $L\lambda_6$. The dispersive element 12 combines the wavelength components $L\lambda_1$ to $L\lambda_6$ of the pulsed light $Lp_1$ after the modulation, and combines the wavelength components $L\lambda_1$ to $L\lambda_6$ of the pulses light $Lp_2$. The pulsed light $Lp_1$ and the pulsed light $Lp_2$ after the combining are reflected at the beam splitter 11 and are output in a direction different from the input direction of the pulsed light Lp.

Here, in the present embodiment, a configuration in which the dispersive element 12 and the focusing optical system 13 perform the dispersion and the combining has been described, however, the dispersion and the combining may be respectively performed by separate elements. For example, such a configuration becomes possible by setting the SLM 14 to be a transmission type, and arranging a dispersive element that outputs the wavelength components $L\lambda_1$ to $L\lambda_6$ transmitted through the SLM 14 into different directions, and a focusing optical system that spatially superimposes the output wavelength components $L\lambda_1$ to $L\lambda_6$ and collimates the wavelength components $L\lambda_1$ to to $L\lambda_6$ at a rear stage of the SLM 14.

Further, the wavelength components $L\lambda_1$ to $L\lambda_6$ output from the SLM 14 may be guided to the irradiation optical system 23, and the pulsed light $Lp_1$ and the pulsed light $Lp_2$ may be generated by the focusing of light by the irradiation optical system 23. Further, in the present embodiment, the pulsed light Lp, and the pulsed light $Lp_1$ and the pulsed light $Lp_2$ have been separated using the beam splitter 11, however, for example, the pulsed light Lp, and the pulsed light $Lp_1$ and the pulsed light $Lp_2$ can be separated without using the beam splitter 11 by inclining the input directions of the wavelength components $L\lambda_1$ to $L\lambda_6$ to the modulation plane 14a, with respect to a normal line of the modulation plane 14a.

Referring back to FIG. 1. The irradiation optical system 23 irradiates the imaging object B with the pulsed light $Lp_1$ and the pulsed light $Lp_2$ generated in the optical pulse shaping unit 10A.

The imaging object B receives the irradiation with the pulsed light $Lp_1$ and the pulsed light $Lp_2$, and reflects or transmits the pulsed light $Lp_1$ and the pulsed light $Lp_2$. The transmitted light or the reflected light holds image information of the imaging object B at an irradiation time $t_1$ of the pulsed light $Lp_1$ and an irradiation time $t_2$ ($\neq t_1$) of the pulsed light $Lp_2$.

Since the polarization directions of the pulsed light $Lp_1$ and the pulsed light $Lp_2$ reflected by or transmitted through the imaging object B are different from each other, these can be separated on the basis of the polarization directions. The light separation element 24 is an optical element that receives the pulsed light $Lp_1$ and the pulsed light $Lp_2$ reflected by or transmitted through the imaging object B, and separates the pulsed light $Lp_1$ and the pulsed light $Lp_2$ on the basis of the polarization directions.

The light separation element 24 is favorably realized by, for example, a Glan-Thompson prism, a Wollaston prism, a Savart plate, a polarization beam splitter, or a polarization prism. In the example illustrated in FIG. 1, the light separation element 24 has a polarization selection plane 24a, and the pulsed light $Lp_1$ is transmitted through the polarization selection plane 24a and is output from one light output plane, and the pulsed light $Lp_2$ is reflected at the polarization selection plane 24a and is output from another light output plane.

The imaging unit 25 is optically coupled to the one light output plane of the light separation element 24, and includes a photodetector that captures an image by the separated pulsed light $Lp_1$. That is, the imaging unit 25 performs imaging at the timing in synchronization with the irradiation timing of the pulsed light $Lp_1$ as strobe light. The imaging unit 26 is optically coupled to the other light output plane of the light separation element 24, and captures an image by the separated pulsed light $Lp_2$. That is, the imaging unit 26 performs imaging at the timing in synchronization with the irradiation timing of the pulsed light $Lp_2$ as strobe light.

The two images captured by the imaging units 25 and 26 are images at the irradiation times $t_1$ and $t_2$, respectively, and are successive images with an extremely short time interval (for example, on the femtosecond order). In moving image capturing, these images constitute successive frames. Here, in the present embodiment, the imaging unit 25 includes a first imaging element, and the imaging unit 26 includes a second imaging element different from the first imaging element. In other words, the imaging units 25 and 26 are constituted by separate imaging elements, respectively. Each of the imaging units 25 and 26 is favorably constituted by, for example, a CCD image sensor, a CMOS image sensor, or a streak camera.

Further, as described above, in the present embodiment, the intensity ratio of the pulsed light $Lp_1$ and the pulsed light $Lp_2$ can be controlled by controlling the rotation angle θ in the polarization control unit 22. That is, by controlling the rotation angle θ, an exposure amount of each frame image can be adjusted.

Here, an example of a method of adjusting the imaging interval (frame interval) in the case where the temporal intensity waveform of the pulsed light $Lp_1$ is not changed (see (b) in FIG. 3) will be described. (a) in FIG. 5 illustrates a spectrum waveform (graph G1: spectrum intensity, graphs G21 to G23: spectrum phase) to be applied to the pulsed light $Lp_1$. Graphs G31 to G33 in (b) in FIG. 5 illustrate the temporal intensity waveforms of the pulsed light $Lp_1$ and a graph G4 illustrates the temporal intensity waveform of the pulsed light $Lp_2$. (c) in FIG. 5 illustrates the polarization directions of the pulsed light components illustrated in (b) in FIG. 5.

As illustrated in (a) in FIG. 5, the SLM 14 applies the linear function type phase pattern G21 to the pulsed light $Lp_1$. Then, the slope is sequentially tilted as illustrated in the graphs G22 and G23 (arrows A1 in the figure). As a result, the pulsed light $Lp_1$ is sequentially moved from the graph G31 through G32 to G33 (arrow A2 in the figure), and therefore, the time difference between the pulsed light $Lp_1$ and the pulsed light $Lp_2$ is sequentially changed. That is, since the interval between the irradiation times $t_1$ and $t_2$ is sequentially changed, the imaging interval can be adjusted (set) to an arbitrary time by setting an appropriate slope. In principle, the imaging interval can be made as short as possible.

Next, an example of a method of adjusting the imaging interval (frame interval) in the case where the temporal intensity waveform of the pulsed light $Lp_1$ is changed (see (c) in FIG. 3) will be described. (a) in FIG. 6 illustrates a spectrum waveform (graph G5: spectrum intensity, graph G6: spectrum phase) to be applied to the pulsed light $Lp_1$. A graph G7 in (b) in FIG. 6 illustrates the temporal intensity waveform of the pulsed light $Lp_1$ and a graph G8 illustrates the temporal intensity waveform of the pulsed light $Lp_2$. (c) in FIG. 6 illustrates the polarization directions of the pulsed light components illustrated in (b) in FIG. 6.

As illustrated in (a) in FIG. 6, the SLM 14 applies the phase pattern G6 obtained by adding a linear function type phase pattern for applying a time delay, and a phase pattern (for example, a quadratic function type phase pattern) for controlling the temporal intensity waveform, to the pulsed light $Lp_1$. As a result, the temporal intensity waveform of the pulsed light $Lp_1$ is controlled to an arbitrary shape. FIG. 6 illustrates an example in which the time width of the pulsed light $Lp_1$ is extended by the quadratic function type phase pattern. In this example, the illumination (exposure) time of the pulsed light $Lp_1$ to the imaging object B is longer than that of the pulsed light $Lp_2$ due to the extension of the time width. That is, the illumination (exposure) time can be adjusted.

Then, as in the case of FIG. 5, the slope of the linear function type phase pattern constituting the phase pattern G6 is sequentially tilted (arrows A1). As a result, the pulsed light $Lp_1$ is sequentially moved on the time axis (arrow A2), and the time difference between the pulsed light $Lp_1$ and the pulsed light $Lp_2$ is sequentially changed. That is, since the interval between the irradiation times $t_1$ and $t_2$ is sequentially changed, the imaging interval can be adjusted (set) to an arbitrary time by setting an appropriate slope.

Figure 7:
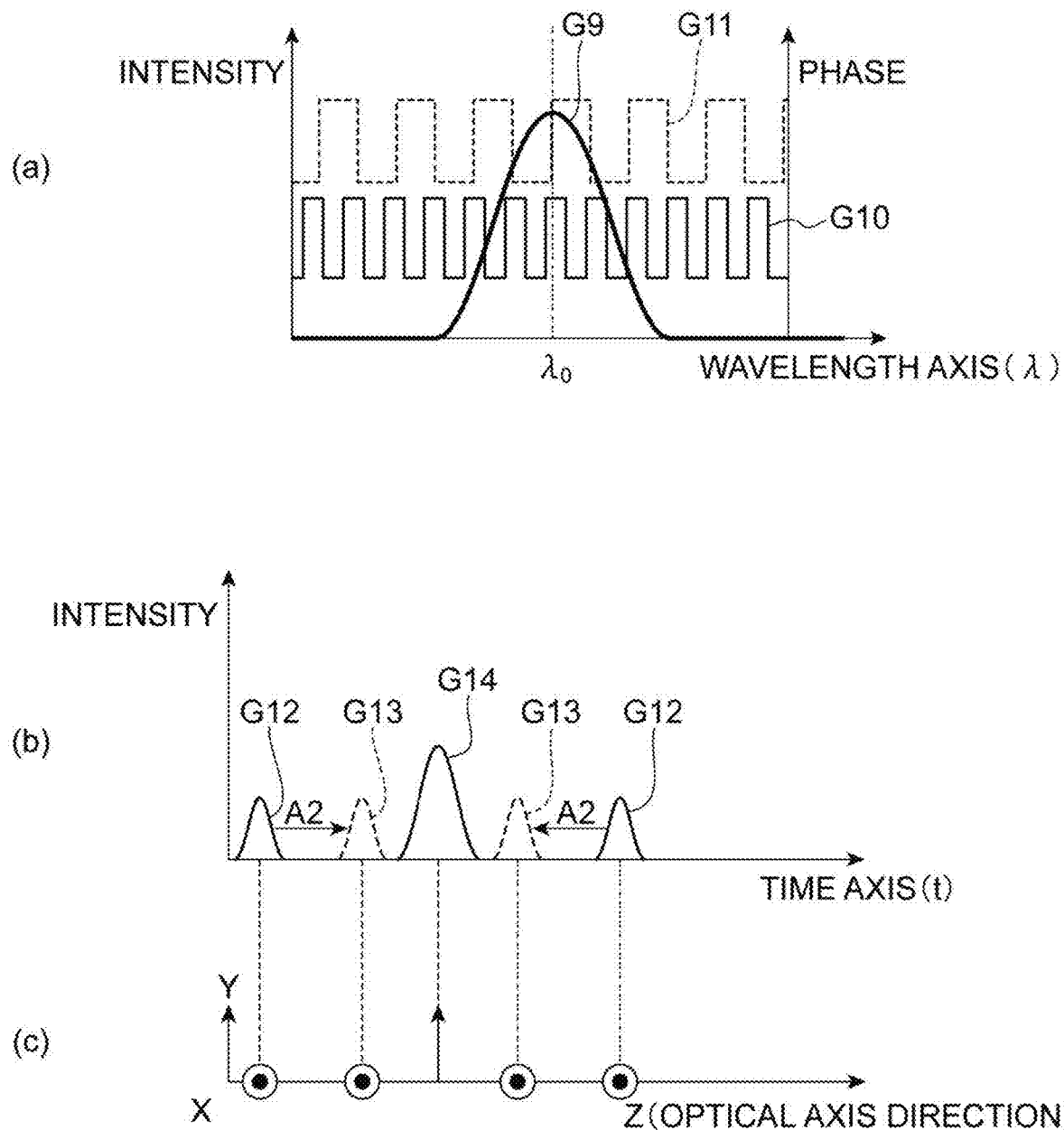
FIG. 7 includes diagrams illustrating (a) a spectrum waveform to be applied to first pulsed light, (b) temporal intensity waveforms of first pulsed light and second pulsed light, and (c) polarization directions of pulsed light components illustrated in (b).

The change of the temporal intensity waveform of the pulsed light $Lp_1$ is not limited to the above extension of the time width, and can be any shape (for example, a rectangular pulse, a triangular pulse, a double pulse, or the like). FIG. 7 shows diagrams illustrating a method of adjusting the imaging interval (frame interval) in the case where the temporal intensity waveform of the pulsed light $Lp_1$ is a double pulse. (a) in FIG. 7 illustrates a spectrum waveform (graph G9: spectrum intensity, graphs G10 and G11: spectrum phase) to be applied to the pulsed light $Lp_1$. Graphs G12 and G13 in (b) in FIG. 7 illustrate the temporal intensity waveforms of the pulsed light $Lp_1$ and a graph G14 illustrates the temporal intensity waveform of the pulsed light $Lp_2$. (c) in FIG. 7 illustrates the polarization directions of the pulsed light components illustrated in (b) in FIG. 7.

As illustrated in (a) in FIG. 7, the SLM 14 applies the phase pattern G10 in which up and down of a phase value is periodically repeated corresponding to change of the wavelength, to the pulsed light $Lp_1$. Then, the period of the spectrum phase pattern is sequentially changed to the graph G11. As a result, the pulsed light $Lp_1$ is sequentially moved from the graph G12 to the graph G13 (arrows A2 in the figure), and therefore, the time difference between the pulsed light $Lp_1$ and the pulsed light $Lp_2$ is sequentially changed. That is, since the interval between the irradiation times $t_1$ and $t_2$ is sequentially changed, the imaging interval can be adjusted (set) to an arbitrary time by setting an appropriate period of the spectrum phase pattern.

Here, as illustrated in (c) in FIG. 5, (c) in FIG. 6, and (c) in FIG. 7, even when the time difference between the pulsed light $Lp_1$ and the pulsed light $Lp_2$ is sequentially changed, the polarization direction (modulation axis direction X) of the pulsed light $Lp_1$ and the polarization direction (non-modulation axis direction Y) of the pulsed light $Lp_2$ always maintain the orthogonal state regardless of the time difference.

Figure 8:
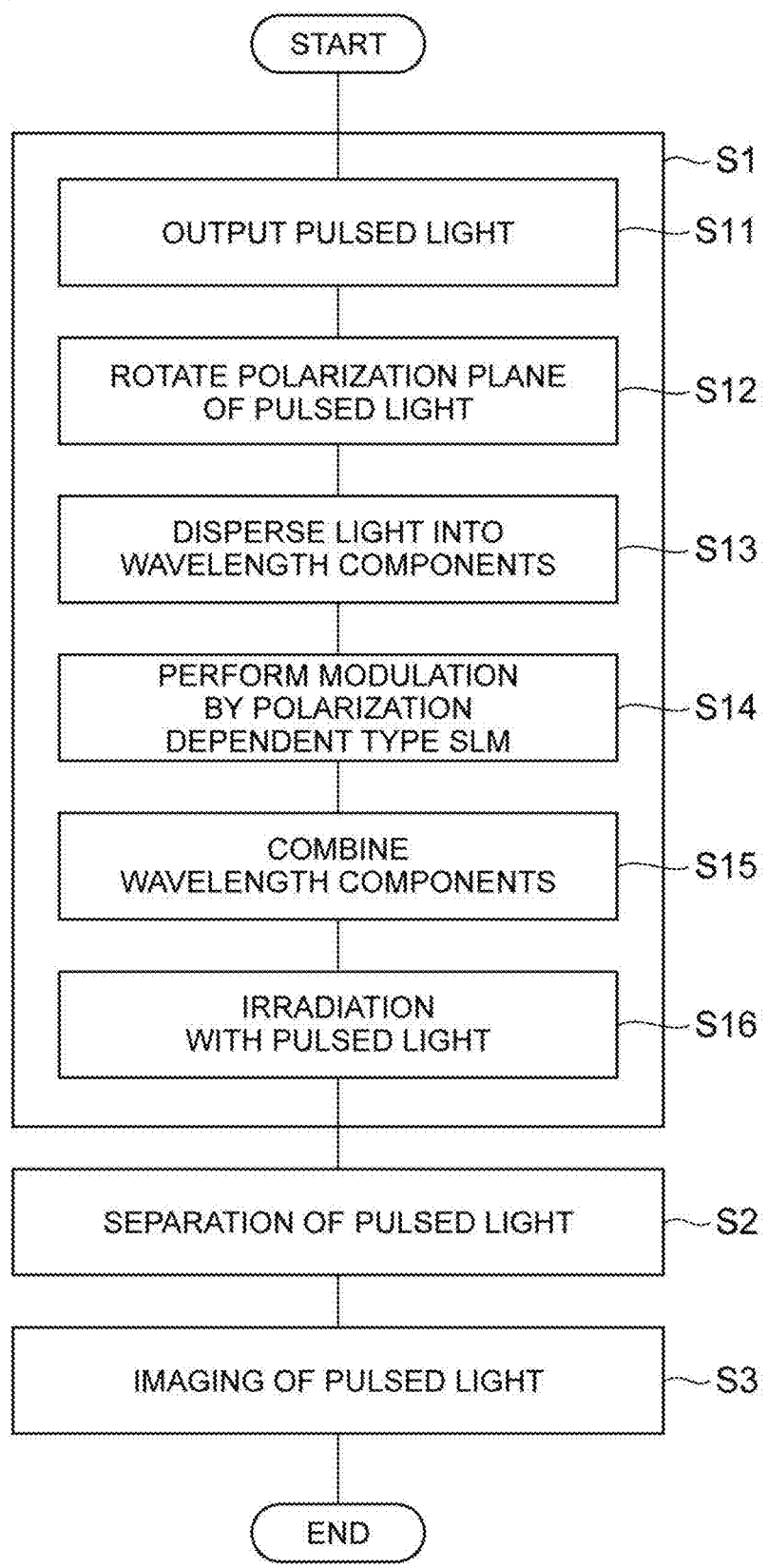
FIG. 8 is a flowchart illustrating an imaging method according to an embodiment.

Here, an imaging method of the present embodiment using the imaging system 1A will be described in detail. FIG. 8 is a flowchart illustrating an imaging method. First, the imaging object B is irradiated with the pulsed light $Lp_1$ and the pulsed light $Lp_2$ with a time difference (step S1).

Specifically, first, the pulsed light Lp is output from the light source 21 (light output step S11). Next, the polarization plane of the pulsed light Lp is rotated by the polarization control unit 22 (polarization control step S12). Subsequently, the pulsed light Lp is dispersed for each wavelength by the dispersive element 12 (dispersion step S13). Then, the phase spectrum of the pulsed light Lp after the dispersion is modulated for each wavelength by using the polarization dependent type SLM 14 (modulation step S14).

At this time, the time difference is generated between the first polarization component $E_{MO}$ and the second polarization component $E_{NON}$ by modulating the phase spectrum of the first polarization component $E_{MO}$ of the pulsed light Lp along the modulation axis direction X, in the state where the polarization plane of the pulsed light Lp to be input to the SLM 14 is inclined with respect to the modulation axis direction X. With the configuration, the pulsed light $Lp_2$, and the pulsed light $Lp_1$ having the time difference with respect to the pulsed light $Lp_2$ are generated.

Here, in this step, the phase spectrum of the first polarization component $E_{MO}$ may be further modulated to convert the temporal intensity waveform of the pulsed light $Lp_1$ into an arbitrary waveform. Thereafter, the wavelength components $L\lambda_1$ to $L\lambda_6$ of the pulsed light $Lp_1$ and the pulsed light $Lp_2$ after the modulation are combined by the dispersive element 12 (combining step S15), and the imaging object B is irradiated with the pulsed light $Lp_1$ and the pulsed light $Lp_2$ after the combining (irradiation step S16). Here, in the present embodiment, the dispersion step S13, the modulation step S14, and the combining step S15 constitute an optical pulse shaping step.

Subsequently, the pulsed light $Lp_1$ and the pulsed light $Lp_2$ reflected by or transmitted through the imaging object B are separated by the light separation element 24 on the basis of the polarization directions (light separation step S2). Thereafter, the separated pulsed light $Lp_1$ and pulsed light $Lp_2$ are imaged by the imaging units 25 and 26, respectively (imaging step S3).

Effects obtained by the imaging system 1A and the imaging method of the above present embodiment will be described. As described above, in the conventional method to irradiate the imaging object with irradiation light (strobe light) including a plurality of light pulses having different wavelengths from each other and having a time difference, when the time difference (that is, the frame interval) of the plurality of light pulses is attempted to be made short, each of the light pulses is subject to the band limitation, and the temporal waveform is significantly extended. As a result, there is a problem of occurrence of motion blur in the captured image.

In contrast, in the imaging system 1A and the imaging method of the present embodiment, the irradiation apparatus 3 (or in the irradiation step S1) irradiates the imaging object B with the pulsed light $Lp_1$ and the pulsed light $Lp_2$ having different polarization directions from each other and having a time difference as irradiation light (strobe light). Then, the reflected light or the transmitted light from the imaging object B is separated on the basis of the polarization directions. In this case, since the pulsed light $Lp_1$ and the pulsed light $Lp_2$ are not subject to the band limitation, the time difference between the pulsed light $Lp_1$ and the pulsed light $Lp_2$ can be made shorter than the conventional technique. That is, according to the imaging system 1A and the imaging method of the present embodiment, the frame interval can be further shortened without being affected by motion blur.

Further, according to the irradiation apparatus 3 of the present embodiment, since the delay time of the pulsed light $Lp_1$ can be changed by changing the phase pattern presented in the SLM 14, the frame interval can be easily changed.

Further, as in the present embodiment, the irradiation apparatus 3 may include the polarization control unit 22 that rotates the polarization plane of the initial pulsed light Lp to be input to the SLM 14. With the configuration, the polarization plane of the initial pulsed light Lp can be easily inclined with respect to the modulation axis direction X. In this case, the polarization control unit 22 may be able to variably set the polarization plane rotation angle. With the configuration, the intensity ratio of the first pulsed light $Lp_1$ and the second pulsed light $Lp_2$ can be easily changed.

Further, as in the present embodiment, the imaging unit 25 may include the first imaging element, and the imaging unit 26 may include the second imaging element different from the first imaging element. With such a configuration, the pulsed light $Lp_1$ and the pulsed light $Lp_2$ having an extremely short time difference can be favorably imaged.

First Modification

Figure 9:
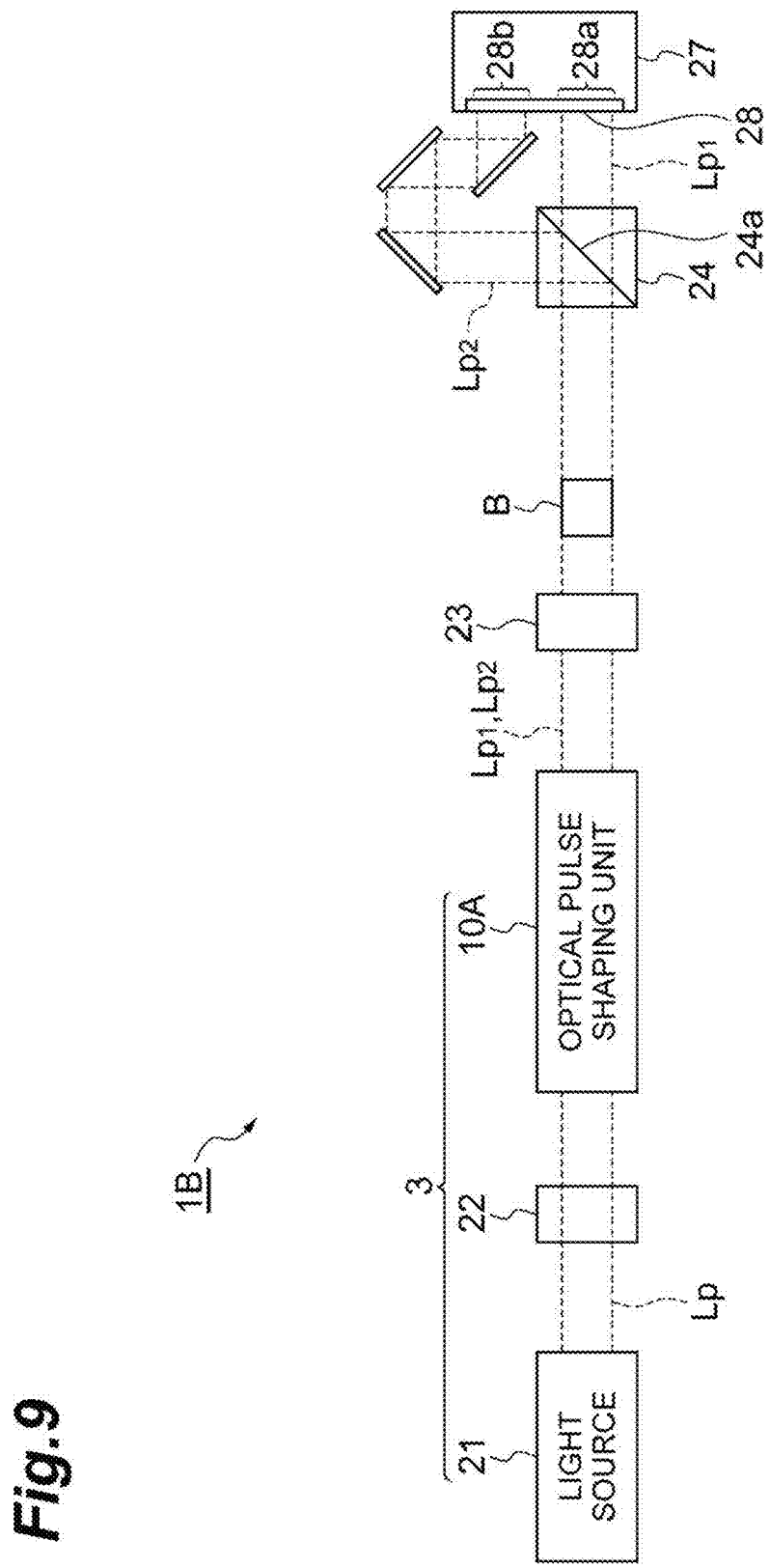
FIG. 9 is a diagram illustrating a first modification.

FIG. 9 is a diagram illustrating a configuration of an imaging system 1B according to a first modification of the above embodiment. The difference between the imaging system 1B and the above embodiment is the configuration of the first and second imaging units. Here, the configuration of the imaging system 1B except for the first and second imaging units is similar to the above embodiment, and thus detailed description is omitted.

Figure 10:
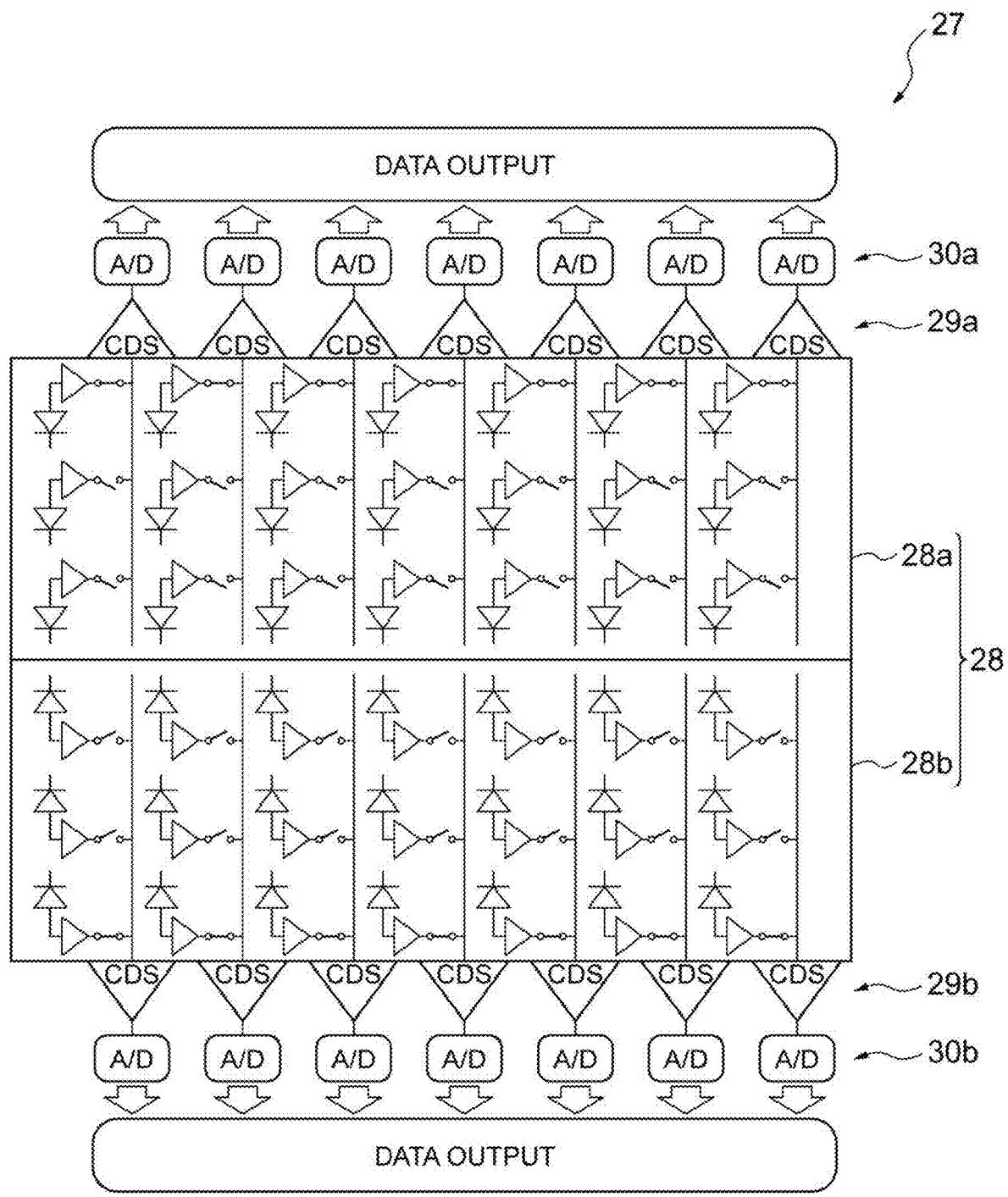
FIG. 10 is a diagram illustrating an imaging plane of an imaging element according to the first modification.

The imaging system 1B includes an imaging element 27 in place of the imaging units 25 and 26 of the above embodiment. FIG. 10 is a plan view illustrating a light receiving plane 28 of the imaging element 27. As illustrated in FIG. 10, the light receiving plane 28 has two light receiving areas 28a and 28b. The light receiving area 28a is a first imaging unit of the present modification and the light receiving area 28b is a second imaging unit of the present modification. As described above, in the present modification, the first imaging unit and the second imaging unit are constituted by the separate areas 28a and 28b in the light receiving plane 28 of the common imaging element 27.

A charge generated in the light receiving area 28a is read out by a readout circuit including a CDS array 29a and an A/D conversion element array 30a, and is output to the outside. A charge generated in the light receiving area 28b is read out by a readout circuit including a CDS array 29b and an A/D conversion element array 30b, and is output to the outside. Further, the charges generated in the light receiving areas 28a and 28b may be read out by a common readout circuit including a CDS array and an A/D conversion element array, and output to the outside.

As illustrated in FIG. 9, the light receiving area 28a is optically coupled to one light output plane of a light separation element 24, and captures an image of separated pulsed light $Lp_1$. That is, the light receiving area 28a captures an image of the pulsed light $Lp_1$ as strobe light at timing in synchronization with the irradiation timing. The light receiving area 28b is optically coupled to the other light output plane of the light separation element 24, and captures an image of separated pulsed light $Lp_2$. That is, the light receiving area 28b captures an image of the pulsed light $Lp_2$ as strobe light at timing in synchronization with the irradiation timing.

The two images captured by the light receiving areas 28a and 28b are images at the irradiation times $t_1$ and $t_2$, respectively, and are successive images with an extremely short time interval (for example, on the femtosecond order). In video capturing, these images constitute successive frames. The imaging element 27 is favorably constituted by, for example, a CCD image sensor or a CMOS image sensor.

As in the present modification, the first and second imaging units may be constituted by the separate areas 28a and 28b in the light receiving plane 28 of the common imaging element 27. Even with such a configuration, the pulsed light $Lp_1$ and the pulsed light $Lp_2$ having an extremely short time difference can be favorably imaged.

Second Modification

Figure 11:
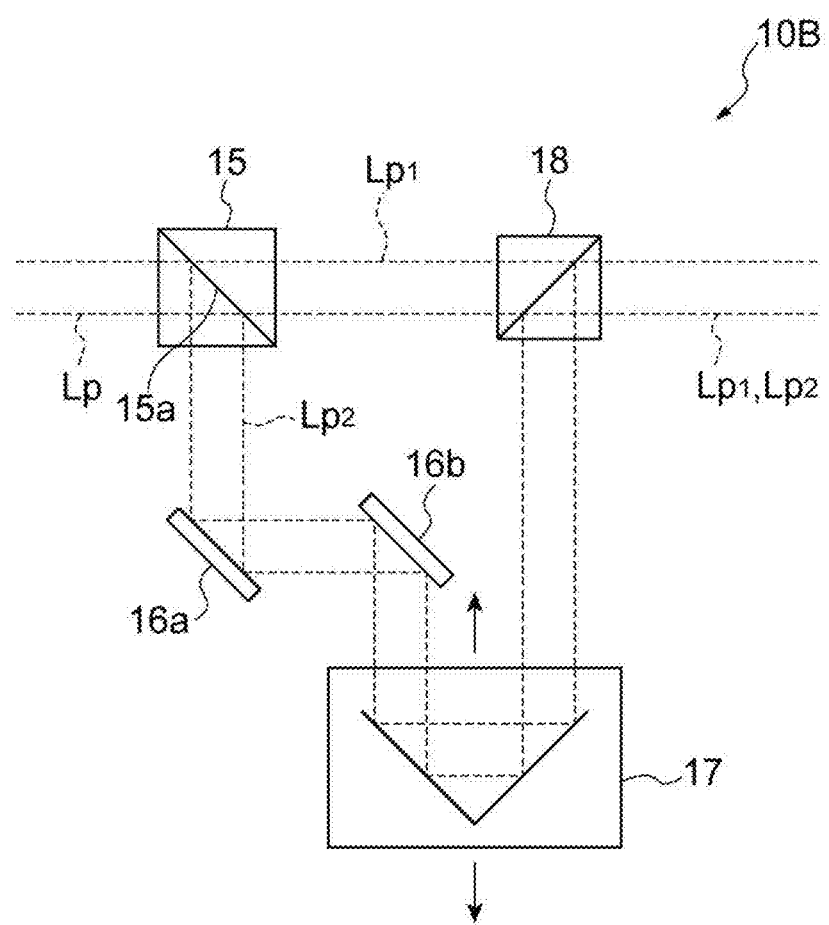
FIG. 11 is a diagram illustrating a second modification.

FIG. 11 is a diagram illustrating a configuration of an optical pulse shaping unit (pulse shaper) 10B according to a second modification of the above embodiment. The optical pulse shaping unit 10B of the present modification generates pulsed light $Lp_1$ having a first polarization direction, and pulsed light $Lp_2$ having a second polarization direction intersecting with (for example, orthogonal to) the first polarization direction from the input pulsed light Lp. Further, the optical pulse shaping unit 10B applies a time difference to the pulsed light $Lp_1$ and the pulsed light $Lp_2$. The optical pulse shaping unit 10B of the present modification includes a light separation element 15, total reflection mirrors 16a and 16b, a moving mirror (optical path length changing unit) 17, and a light coupling element 18.

The light separation element 15 separates initial pulsed light Lp input from a polarization control unit 22 on the basis of the polarization directions. With the configuration, the pulsed light $Lp_1$ having the first polarization direction and the pulsed light $Lp_2$ having the second polarization direction are generated from the pulsed light Lp.

The light separation element 15 is favorably realized by, for example, a Glan-Thompson prism, a Wollaston prism, a Savart plate, a polarization beam splitter, or a polarization prism. In the example illustrated in FIG. 11, the light separation element 15 has a polarization selection plane 15a, and the pulsed light $Lp_1$ is transmitted through the polarization selection plane 15a and is output from one light output plane, and the pulsed light $Lp_2$ is reflected at the polarization selection plane 15a and is output from the other light output plane.

The total reflection mirrors 16a and 16b are optically coupled to the light separation element 15, and change an optical path of the pulsed light $Lp_2$ and guide the light to the moving mirror 17. The moving mirror 17 is configured to be able to electrically control its reflection position, and reflects the pulsed light $Lp_2$ and changes the optical path length.

The light coupling element 18 receives the pulsed light $Lp_1$ from the light separation element 15, and receives the pulsed light $Lp_2$ from the moving mirror 17. The light coupling element 18 transmits or reflects light according to the polarization direction. That is, the light coupling element 18 transmits (or reflects) the pulsed light $Lp_1$ and reflects (or transmits) the pulsed light $Lp_2$. As a result, the optical paths of the pulsed light $Lp_1$ and the pulsed light $Lp_2$ coincide again.

Further, since the pulsed light $Lp_2$ passes through the total reflection minors 16a and 16b and the moving mirror 17, unlike the pulsed light $Lp_1$, the optical path length of the pulsed light $Lp_2$ is longer than the optical path length of the pulsed light $Lp_1$. Therefore, the pulsed light $Lp_2$ is temporally delayed from the pulsed light $Lp_1$ when having passed through the light coupling element 18. That is, a time difference is applied between the pulsed light $Lp_1$ and the pulsed light $Lp_2$. The light coupling element 18 is favorably realized by, for example, a Glan-Thompson prism, a Wollaston prism, a Savart plate, a polarization beam splitter, or a polarization prism.

The configuration of the irradiation apparatus including the optical pulse shaping unit is not limited to the above embodiment, and may be, for example, the configuration of the present modification. Even in this case, effects similar to those of the above embodiment can be exhibited.

The imaging system and the imaging method are not limited to the above-described embodiments, and various other modifications can be made. For example, in the above embodiment, the polarization plane of the pulsed light to be input to the SLM is inclined by the polarization control unit with respect to the polarization direction in which the SLM has a modulation function, however, the SLM itself may be inclined. That is, the polarization control unit can be made unnecessary by inclining the SLM such that the polarization direction having a modulation function is inclined with respect to the polarization plane of the pulsed light to be input to the SLM.

Further, in the above embodiment, an LCOS type SLM has been exemplified as the SLM, however, another liquid crystal type SLM (for example, an electric address type, an optical address type, or the like) may be applied as the SLM.

The imaging system according to the above embodiment is configured to include a light source for outputting at least one initial pulsed light, a polarization control unit for rotating a polarization plane of the initial pulsed light, an optical pulse shaping unit for inputting the initial pulsed light with the rotated polarization plane, and outputting first pulsed light having a first polarization direction and second pulsed light having a second polarization direction different from the first polarization direction with a time difference from each other, an irradiation optical system for irradiating an imaging object with the first pulsed light and the second pulsed light, a light separation element for separating the first pulsed light and the second pulsed light reflected by or transmitted through the imaging object on the basis of the polarization directions, a first imaging unit for capturing an image of the separated first pulsed light, and a second imaging unit for capturing an image of the separated second pulsed light.

Further, the imaging method according to the above embodiment is configured to include a light output step of outputting at least one initial pulsed light, a light control step of rotating a polarization plane of the initial pulsed light, an optical pulse shaping step of inputting the initial pulsed light with the rotated polarization plane, and outputting first pulsed light having a first polarization direction and second pulsed light having a second polarization direction different from the first polarization direction with a time difference from each other, an irradiation step of irradiating an imaging object with the first pulsed light and the second pulsed light, a separation step of separating the first pulsed light and the second pulsed light reflected by or transmitted through the imaging object on the basis of the polarization directions, and an imaging step of capturing images of the separated first pulsed light and the separated second pulsed light.

In the above imaging system, the optical pulse shaping unit may include a dispersive element for dispersing the initial pulsed light with the rotated polarization plane for respective wavelengths, and a polarization dependent type spatial light modulator having a modulation function in the first polarization direction. Further, in the above imaging system, the spatial light modulator may input the initial pulsed light with the polarization plane rotated with respect to the first polarization direction and dispersed for respective wavelengths, and modulate a phase spectrum of a polarization component in the first polarization direction included in the initial pulsed light. Further, in the above imaging method, the optical pulse shaping step may include inputting the pulsed light with the rotated polarization plane and dispersed for respective wavelengths to a spatial light modulator, and modulating, by the spatial light modulator, a phase spectrum of a polarization component in the first polarization direction included in the initial pulsed light.

In the optical pulse shaping unit (optical pulse shaping step), after the initial pulsed light is dispersed for respective wavelength components, the wavelength component is modulated for each wavelength by the spatial light modulator. Thereafter, the respective modulated wavelength components are combined. Therefore, an arbitrary time delay can be applied by controlling the phase pattern presented in the spatial light modulator.

In addition, in the optical pulse shaping unit (optical pulse shaping step), the spatial light modulator is a polarization dependent type, and the polarization plane of the initial pulsed light input to the spatial light modulator is inclined (rotated) with respect to the polarization direction in which the spatial light modulator has a modulation function. That is, the polarization component in the above polarization direction is modulated, and a polarization component that is different from (for example, orthogonal to) the above polarization component is not modulated. Therefore, for example, the time difference can be caused between the first pulsed light having the first polarization direction and the second pulsed light having the second polarization direction by applying the time delay to the polarization component in the first polarization direction. Further, since the delay time can be changed by changing the phase pattern presented in the spatial light modulator, the frame interval can be easily changed.

In the above imaging system, a polarization plane rotation angle of the polarization control unit may be changeable. Further, in the above imaging method, a polarization plane rotation angle in the light control step may be changeable. With the configuration, the intensity ratio between the first pulsed light and the second pulsed light can be easily changed.

In the above imaging system and imaging method, the first imaging unit may include a first imaging element, and the second imaging unit may include a second imaging element different from the first imaging element. Further, the first imaging unit and the second imaging unit may include a common imaging element. For example, according to any of these configurations, the first pulsed light and the second pulsed light having an extremely short time difference can be favorably imaged.

INDUSTRIAL APPLICABILITY

The embodiment can be used as an imaging system and an imaging method.

REFERENCE SIGNS LIST 1A, 1B—imaging system, 3—irradiation apparatus, 10A, 10B—optical pulse shaping unit, 11—beam splitter, 12—dispersive element, 13—focusing optical system, 14—SLM, 14a—modulation plane, 15—light separation element, 15a—polarization selection plane, 16a, 16b—total reflection mirror, 17—moving mirror, 18—light coupling element, 21—light source, 22—polarization control unit, 23—irradiation optical system, 24—light separation element, 24a—polarization selection plane, 25—first imaging unit, 26—second imaging unit, 27—imaging element, 28—light receiving plane, 28a, 28b—light receiving area, 29a, 29b—CDS array, 30a, 30b—conversion element array, B—imaging object, Lp—initial pulsed light, $Lp_1$—first pulsed light, $Lp_2$—second pulsed light.

The invention claimed is:
1. An imaging system comprising:
a light source configured to output at least one initial pulsed light;
a polarization controller configured to rotate a polarization plane of the initial pulsed light;
an optical pulse shaper configured to input the initial pulsed light with the rotated polarization plane, and output first pulsed light having a first polarization direction and second pulsed light having a second polarization direction different from the first polarization direction with a time difference from each other;
an irradiation optical system configured to irradiate an imaging object with the first pulsed light and the second pulsed light;
a light separator configured to separate the first pulsed light and the second pulsed light reflected by or transmitted through the imaging object on the basis of the polarization directions;
a first camera configured to capture an image of the separated first pulsed light; and
a second camera configured to capture an image of the separated second pulsed light,
wherein the optical pulse shaper includes:
a dispersive element configured to disperse the initial pulsed light with the rotated polarization plane for respective wavelengths, and
a polarization dependent type spatial light modulator having a modulation function in the first polarization direction and not having a modulation function in the second polarization direction, and
wherein the spatial light modulator modulates only the polarization component of the initial pulsed light along the first polarization direction so that the second pulsed light, and the first pulsed light having the time difference with respect to the second pulsed light are generated.

2. The imaging system according to claim 1, wherein the spatial light modulator is configured to input the initial pulsed light with the polarization plane rotated with respect to the first polarization direction and dispersed for respective wavelengths, and modulate a phase spectrum of a polarization component in the first polarization direction included in the initial pulsed light.

3. The imaging system according to claim 1, wherein a polarization plane rotation angle of the polarization controller is changeable.

4. The imaging system according to claim 1, wherein the first camera includes a first imaging element, and the second camera includes a second imaging element different from the first imaging element.

5. The imaging system according to claim 1, wherein the first camera and the second camera include a common imaging element.

6. An imaging method comprising:
  outputting at least one initial pulsed light;
  rotating a polarization plane of the initial pulsed light;
  performing an optical pulse shaping of inputting the initial pulsed light with the rotated polarization plane, and outputting first pulsed light having a first polarization direction and second pulsed light having a second polarization direction different from the first polarization direction with a time difference from each other;
  irradiating an imaging object with the first pulsed light and the second pulsed light;
  separating the first pulsed light and the second pulsed light reflected by or transmitted through the imaging object on the basis of the polarization directions; and
  capturing images of the separated first pulsed light and the second pulsed light,
  wherein the optical pulse shaping includes inputting the pulsed light with the rotated polarization plane and dispersed for respective wavelengths to a spatial light modulator, and modulating, by the spatial light modulator, a phase spectrum of a polarization component in the first polarization direction included in the initial pulsed light,
  wherein the spatial light modulator is a polarization dependent type spatial light modulator having a modulation function in the first polarization direction and not having a modulation function in the second polarization direction, and
  wherein the spatial light modulator modulates only the polarization component of the initial pulsed light along the first polarization direction so that the second pulsed light, and the first pulsed light having the time difference with respect to the second pulsed light are generated.

\* \* \* \* \*